United States Patent
Siehl et al.

(10) Patent No.: US 11,774,331 B2
(45) Date of Patent: Oct. 3, 2023

(54) COVERSLIPPING MACHINE

(71) Applicant: Leica Biosystems Nussloch GmbH, Nussloch (DE)

(72) Inventors: Benjamin Siehl, Nussloch (DE); Markus Sharpe, Heidelberg (DE); Markus Wittmann, Heidelberg (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 0 days.

(21) Appl. No.: 17/673,176

(22) Filed: Feb. 16, 2022

(65) Prior Publication Data

US 2022/0170832 A1    Jun. 2, 2022

Related U.S. Application Data

(63) Continuation of application No. 16/626,371, filed as application No. PCT/EP2019/054629 on Feb. 25, 2019, now Pat. No. 11,280,709.

(30) Foreign Application Priority Data

Mar. 1, 2018 (DE) ............ 10 2018 104 709.6

(51) Int. Cl.
*G01N 1/00* (2006.01)
*G01N 1/31* (2006.01)
*G01N 35/00* (2006.01)

(52) U.S. Cl.
CPC ....... *G01N 1/312* (2013.01); *G01N 35/00029* (2013.01); *G01N 35/00712* (2013.01);
(Continued)

(58) Field of Classification Search
None
See application file for complete search history.

(56) References Cited

U.S. PATENT DOCUMENTS 6,058,788 A    5/2000    Thiem et al.
6,780,380 B2   8/2004    Hunnell et al.
(Continued)

FOREIGN PATENT DOCUMENTS

JP    2001215415 A    8/2001
WO    2018017744 A1   1/2018

OTHER PUBLICATIONS

Leica Microsystems, Leica ST5020 Multistainer and LEICA CV5030 Glass Coverslipper, Jul. 1, 2004.
(Continued)

*Primary Examiner* — Jyoti Nagpaul
(74) *Attorney, Agent, or Firm* — Hodgson Russ LLP (57) ABSTRACT

A system having a first automatic machine (1) for processing or investigating biological samples and a second automatic machine (16) for processing or investigating biological samples. The first machine (1) and the second machine (16) are electrically connected to an electrical power grid in order to be supplied with electrical energy as an electrical load. The first machine (1) has a first control apparatus (13) and the second machine (16) has a second control apparatus (19), which detect disruptions in the supply of electrical energy from the power grid and, in the event of a disruption, switch over to a withdrawal of electrical energy from a first energy reservoir (12) or a second energy reservoir (18). The first machine (1) and the second machine (16) are also electrically connected to each other, such that the electrical energy is transferrable from an energy store of one of the automatic machines to the other automatic machine.

22 Claims, 3 Drawing Sheets

(52) U.S. Cl.
CPC .............. *G01N 2035/00039* (2013.01); *G01N 2035/00138* (2013.01)

(56) References Cited

U.S. PATENT DOCUMENTS

| | | | |
|---|---|---|---|
| 6,821,072 B2 | 11/2004 | Thiem et al. | |
| 7,133,543 B2 | 11/2006 | Verwoerd et al. | |
| 7,273,000 B2 | 9/2007 | Thiem et al. | |
| 7,468,161 B2* | 12/2008 | Reinhardt | G01N 1/312 422/65 |
| 7,722,811 B2 | 5/2010 | Konrad et al. | |
| 8,383,043 B2* | 2/2013 | Padmanabhan | G01N 29/032 436/63 |
| 9,671,322 B2 | 6/2017 | Berberich | |
| 2002/0052695 A1 | 5/2002 | Arake et al. | |
| 2008/0029218 A1 | 2/2008 | Reinhardt et al. | |
| 2009/0155907 A1 | 6/2009 | Winther et al. | |
| 2012/0192660 A1 | 8/2012 | Hajrovic et al. | |
| 2012/0290127 A1 | 11/2012 | Neef et al. | |
| 2013/0073941 A1 | 3/2013 | Evans et al. | |
| 2017/0176481 A1 | 6/2017 | Accurso et al. | |

OTHER PUBLICATIONS

Leica Microsystems, Living up to Life—Technical Data Sheet—Leica CV5030 Automated Glass Coverslipper, Sep. 1, 2011.

* cited by examiner

Fig. 3

COVERSLIPPING MACHINE

CROSS-REFERENCE TO RELATED APPLICATIONS

The present application is a continuation of U.S. application Ser. No. 16/626,371 filed Dec. 24, 2019, which is the U.S. national phase of International Application No. PCT/EP2019/054629 filed Feb. 25, 2019, which claims priority of German Application No. 10 2018 104 709.6 filed Mar. 1, 2018, the entire disclosures of which are incorporated herein by reference.

FIELD OF THE DISCLOSURE

The invention relates to a coverslipping machine which is embodied to be connected to an electrical power grid in order to be supplied with electrical energy as an electrical load; and which removes specimen slides, having samples present thereon, from a specimen slide magazine and respectively carries out a coverslipping process in which a mounting medium and then a coverslip are applied onto each specimen slide; and which deposits the coverslipped specimen slides in the specimen slide magazine or in a further specimen slide magazine.

BACKGROUND OF THE DISCLOSURE

A number of devices are used for sample preparation in a pathology laboratory. Automated machines, in particular, are utilized in this context.

Firstly the biological samples are fixed, dehydrated, and infiltrated with paraffin. This is usually accomplished using a so-called processor. In the context of processing in a processor, the biological sample is usually present in a closed cassette having small openings for fluid exchange. Often, several cassettes are grouped together in containers and processed simultaneously. A processor is depicted and described, for example, in U.S. Pat. No. 7,722,811 B2. In this processor, the samples are processed in a retort into which various chemicals are pumped.

After paraffin is infiltrated into the sample, it is embedded into a paraffin block. This can be done in particular in an automated embedding machine as depicted and described, for example, in U.S. Pat. No. 9,671,322 B2.

Once the sample has been embedded into a paraffin block, further processing is effected by means of a microtome, with which the paraffin block, along with the included sample, is sectioned into thin slices, called "thin sections," that are each individually applied onto a specimen slide. A microtome is depicted and described, for example, in U.S. Pat. No. 7,273,000 B2. As a rule, the paraffin block is clamped into a specimen holder of the microtome which performs an upward and downward motion and thereby guides the sample over a microtome knife. The result is to produce thin sections of the sample, which are each applied onto a specimen slide and can then usually be further processed in a staining unit. A staining unit is known, for example, from U.S. Pat. No. 6,821,072 B2. In the staining process, each specimen slide passes through several baths having reagents.

Once the staining process is complete, the stained thin section that is present on the specimen slide is covered with a coverslip. This can occur, for example, in a coverslipping machine. A coverslipping machine is also depicted and described in U.S. Pat. No. 6,821,072 B2. In the case of the apparatus known from U.S. Pat. No. 6,821,072 B2, the two units, namely the staining unit and the coverslipping machine, are connected to one another via a transfer station.

In coverslipping machines, firstly a liquid mounting medium is applied by means of a hollow needle onto the stained thin section, and the coverslip is placed thereonto. Adhesive mounting media that act as adhesives, and are therefore also referred to in laboratory jargon as "adhesives," are usually utilized. The mounting medium must then dry in order to prevent the coverslip from shifting on the specimen slide. The stained and coverslipped samples on the specimen slides are then viewed with a microscope or with a microscopic scanning device for diagnosis. A scanning device is depicted and described in U.S. Pat. No. 7,133,543 B2.

During the process described, in most cases several specimen slides are grouped together, above or next to one another, in transportable specimen-slide magazines that are also called "racks." These then pass through the respective process in the various units.

In a coverslipping machine in particular, damage can occur to the samples or even to the coverslipping machine in the event of a power failure.

The object of the present invention is therefore to describe a coverslipping machine in which, in the event of a disruption in the grid power supply, damage to the samples is at least largely ruled out.

SUMMARY OF THE DISCLOSURE

The object is achieved by a coverslipping machine of the kind recited initially which is characterized by an electrical energy reservoir and by an electronic control apparatus which detects disruptions in the supply of electrical energy from the power grid and, in the event of a disruption, switches over to a withdrawal of electrical energy from the electrical energy reservoir, and which carries out a safety routine that includes at least the safety steps of completing the coverslipping of specimen slides already equipped with the mounting medium, and then depositing them in the specimen slide magazine or in the further specimen slide magazine.

It has been recognized in accordance with the present invention that very serious damage to samples and/or to a coverslipping machine can occur if ongoing operation is suddenly interrupted by a power failure. It has been recognized in particular that damage can occur in particular because mounting medium dries out on or in components of the coverslipping machine, or on samples onto which a coverslip has not yet been placed.

It has furthermore been recognized that damage can occur if the coverslipping machine stops in a random and undefined operating state, especially if restarting from that state is not possible because, for example, parameter values that are required, in particular within a control software program for control purposes or in order to identify the individual samples, become lost, or if a restart is prevented for mechanical reasons. It is also possible, disadvantageously, for damage to occur, or for the coverslipping machine to find itself in a state from which a restart is not possible, if the user attempts, by removing parts of the coverslipping machine that has halted in the undefined operating state, to gain access to samples that are being processed so as to remove them.

The invention avoids sudden stoppage of the coverslipping machine in the event of a disruption in energy delivery from the power grid. Provision is made for that purpose according to the present invention that an intelligent safety routine is carried out which includes at least the safety steps of completing the coverslipping of specimen slides already equipped with mounting medium, and then depositing them in the specimen slide magazine or in the further specimen slide magazine; and which in particular can contain further safety steps such as temporarily shutting off components that are not critically necessary and carrying out actions to protect components of the coverslipping machine, as described in detail below.

For example, the safety routine can contain, as a further safety step, conveying back into the specimen slide magazine specimen slides that have been removed from the specimen slide magazine and are not yet equipped with mounting medium. Provision can advantageously be made, in particular, that the specimen slide magazine is then transferred to an output, for example an output drawer, from which the user can remove it. This makes it possible, for example, for the user to manually coverslip specimen slides that are equipped with thin sections.

The coverslipping machine can advantageously comprise a hollow needle, which is attached to a reservoir container having mounting medium and through which a predetermined quantity of mounting medium can be respectively applied onto the specimen slide, the hollow needle being moved relative to the specimen slide, preferably along the longitudinal axis of extent of the specimen slide, upon application. In order to prevent mounting medium from drying in the hollow needle and clogging the hollow needle, the safety routine can advantageously contain, as a further safety step, immersing into a solvent bath the hollow needle that serves to apply mounting medium. The solvent can be, for example, xylene. Because it is advantageous, as already mentioned, if the hollow needle is arranged in motorizedly movable fashion in order to apply the mounting medium onto the specimen slide, it is advantageously easy to implement the motorizedly controlled movability of the hollow needle in such a way that immersion into a solvent bath is also enabled.

As already mentioned, provision is made according to the present invention that coverslipping of specimen slides already equipped with mounting medium is completed, and that they are then deposited in the specimen slide magazine or in the further specimen slide magazine. The advantageous result thereof is that mounting medium that has already been applied is prevented from drying out before a coverslip has been put in place. The safety routine can advantageously contain, as a further safety step, then transferring the further specimen slide magazine to an output, for example an output drawer, for removal by the user. This has the particular advantage that the user can remove the completely coverslipped specimen slide from the coverslipping machine despite the disruption in electrical power delivery.

In particular in order to reduce stress on the energy reservoir of the coverslipping machine, the safety routine can comprise switching off, while the safety steps are being carried out, at least one energy load of the coverslipping machine which is not needed in order to carry out at least one safety step. While the safety routine is being carried out it is possible, for example, to shut off a display, a heating device, a pump, or a transport device until the safety routine has ended or for shorter time intervals while the safety routine is executing, if those electrical loads are not absolutely necessary for carrying out the safety steps of the safety routine or for maintaining the environmental parameters that are important for obtaining the samples. Advantageously, a longer energy reservoir operating time is thereby obtained, while simultaneously eliminating the need to install excessively large energy reservoirs in order to ensure that, in the event of a failure of electrical grid power, enough energy is available to ensure that the safety routine can reliably be carried out to completion.

The control apparatus is preferably embodied in such a way that, in the event of a disruption in the supply of electrical grid power, it switches over without interruption to a withdrawal of electrical energy from the electrical energy reservoir. An embodiment of this kind has the very particular advantage that even very short interruptions in the operation of the coverslipping machine are effectively prevented, since even such interruptions can result in damage, for example if a restart of the coverslipping machine after a brief interruption of this kind is not possible without further interventions.

The safety routine preferably comprises conveying the components of the coverslipping machine into a state from which a restart in normal operating mode is possible without damage. Provision can also advantageously be made, for example, that operating parameters that are important for processing of the sample, and/or data for identifying the individual specimen slides, are stored in an, in particular, nonvolatile data memory so that said data can be accessed upon a restart. The data for identifying the specimen slides can relate, in particular, to the specimen slides that have already been coverslipped, so that after a restart in normal operating mode, only the un-coverslipped ones are reliably coverslipped in the coverslipping machine.

In the normal operating mode, the energy needed to carry out the steps required for coverslipping is then once again taken from the electrical power grid to which the coverslipping machine is connected.

In a particular embodiment, provision is made that, once the safety routine has been carried out, the coverslipping machine is switchable back into a normal operating mode, except that the control apparatus permits switching back only if a disruption in the supply of electrical energy from the power grid no longer exists and/or if the electrical energy reservoir is in a predetermined or predeterminable minimum charge state. In particular, provision can advantageously be made that, once the safety routine has been carried out, the control apparatus switches automatically back into a normal operating mode when it detects that a disruption in the supply of electrical energy from the power no longer exists.

A particularly secure and reliable embodiment of the coverslipping machine according to the present invention is one in which a restart in the normal operating mode is possible only when the electrical energy reservoir is in a predetermined or predeterminable minimum charge state. This embodiment has the particular advantage of ensuring that the safety routine can be executed again if a further disruption in grid power supply should occur.

A very particularly advantageous embodiment of the coverslipping machine is one in which, once the safety routine has been carried out, the control apparatus switches automatically back into a normal operating mode when it detects that a disruption in the supply of electrical energy from the power grid no longer exists, and the electrical energy reservoir is in a predetermined or predeterminable minimum charge state. The minimum charge state is preferably dimensioned in such a way that the safety routine can reliably be carried out in the event of another failure of grid power.

As mentioned earlier, a number of devices for processing and analyzing biological samples are used in a pathology laboratory. In light of the above, a system that includes a coverslipping machine according to the present invention and a further automated machine for processing or investigating biological samples is very particularly advantageous, said system likewise being embodied to be connected to an electrical power grid in order to be supplied with electrical energy as a load, the coverslipping machine and the further automated machine being electrically connected or connectable in such a way that electrical energy is transferrable from the energy reservoir of the coverslipping machine to the further automated machine, and/or that electrical energy is transferrable from the further automated machine to the coverslipping machine.

Such a system has the very particular advantage that electrical energy can be transferred to the further automated machine if necessary, for example so that a safety routine can be carried out there.

An automated machine for processing or investigating biological samples which is particularly advantageous very generally and in accordance with an independent inventive idea is one which is embodied to be connected to an electrical power grid in order to be supplied with electrical energy as a load, and which takes samples from a magazine and delivers them respectively to a processing process in which at least one processing step is carried out, and which then deposits the processed samples in the magazine or in a further magazine, the automated machine comprising an electrical energy reservoir and an electronic control apparatus which detects disruptions in the supply of electrical energy from the power grid and, in the event of a disruption, switches over to a withdrawal of electrical energy from the electrical energy reservoir, and which carries out a safety routine that includes at least the safety steps of completing the processing of samples that are already in the processing process, and then conveying them into a safe position.

The transfer into a safe position can comprise, for example, depositing samples in a specimen slide magazine; advantageously, provision can furthermore be made in particular that in the context of execution of the safety routine, the specimen slide magazine is then transferred to an output, for example to an output drawer, for removal by a user.

The automated machine for processing or investigating biological samples can be embodied, for example, as a stainer. In a stainer in particular, provision can advantageously be made that the safety routine comprises transferring the transport system into a safe state. Alternatively or additionally, the safety routine in the context of a stainer can comprise in particular storing the parameters of the currently running staining program in an, in particular nonvolatile, data memory. Restarting is thereby facilitated, since the parameters can be accessed by reading out the data memory. Provision can furthermore advantageously be made that the safety routine comprises safely parking a specimen slide magazine that is in the transport process, in order to avoid damage to the specimen slides and/or to the samples present thereon and/or in order to prevent them from coming into contact with incorrect staining solutions.

The automated machine for processing or investigating biological samples can also be embodied, for example, as an automatic processor or as an automated embedding machine or as an automatic scanner or as an automatic microtome. With such embodiments as well, in particular analogously to embodiments as a coverslipping machine or as a stainer, it is advantageously possible to perform a respective safety routine that carries out in analogous fashion at least one of the safety steps described here by way of example for a coverslipping machine or a stainer.

The aforementioned automated machines each carry out a plurality of process steps, some of which are time-critical, so that loss of or damage to the respective sample can occur if the intended processing time is too short or is exceeded. For example, drying of the samples in the processor or in the stainer, or the aforementioned drying out of mounting medium on the sample that has not yet been equipped with a coverslip, can result in damage to the respective sample in the coverslipping machine. There are also process steps in which predefined environmental parameters, in particular temperature and/or pressure, must be maintained. In particular, a variety of process steps are provided in which the samples must be processed at a specific pressure, in particular at a pressure below 1 bar, and/or at a minimum temperature, in particular a temperature higher than 20° C. If the predefined environmental parameters are not maintained, damage to the respective sample can occur.

Provision can advantageously be made according to the present invention that the respective safety routine of the automated machine carries out corresponding safety steps in order to avoid damage to the samples and to the machine in consideration of those aspects. This preferably includes maintaining important parameters, such as pressure and temperature, at least until the safety routine is complete, to the extent that damage to the samples is ruled out and/or that important process data, in particular with regard to a restart in normal operating mode, are temporarily stored.

In an automatic coverslipping machine or an automatic scanner, for example, the specimen slides arranged in the specimen slide magazine are automatically removed individually and are conveyed to a processing station. It is important in this context that the association of the specimen slides with the respective cassette compartment of the specimen slide magazine not be lost, and that the transport process be completed. In particular, temporary storage of the relevant data is especially advantageous in the context of execution of the safety routine.

In light of the above, a system that is particularly advantageous very generally and in accordance with an independent inventive idea is one in which two automated machines for processing or investigating biological samples are connected in such a way that electrical energy is transferrable from the energy reservoir of one of the units to the other unit as necessary. As indicated above, it is possible and particularly advantageous for at least one of the units to be embodied as a coverslipping machine. This is not, however, absolutely necessary for implementation of this independent inventive idea. It is instead also possible for the above-described system to comprise a different further automated machine instead of a coverslipping machine. Very generally, it is advantageous to connect two identical or different automated machines in the manner described to yield a system. It is possible in this context for each of the automated machines to be embodied as an automatic scanner or as an automated machine for embedding samples into a paraffin block or as a stainer or as an automatic processor or as a coverslipping machine. The descriptions below of particular embodiments which refer to a system that includes a coverslipping machine are to that extent also analogously applicable according to the present invention to systems that have several automated machines for processing or investigating biological specimens and do not contain coverslipping machines.

With reference to a system that includes a coverslipping machine according to the present invention and at least one further automated machine for processing or investigating biological samples, provision can advantageously be made that the further automated machine includes a further electrical energy reservoir; and that the coverslipping machine and the further automated machine are electrically connected or connectable in such a way that electrical energy is transferrable from the further energy reservoir to the coverslipping machine and/or that electrical energy is transferrable from the coverslipping machine to the further automated machine, in particular to the further energy reservoir. The advantageous result of this is that the further automated machine can also carry out a safety routine if necessary, in which context it can access the energy from its own further energy reservoir or, in particular if the latter is not sufficient, can be supplied with electrical energy from the energy reservoir of the coverslipping machine. Conversely, with such an embodiment it is also possible to supply the coverslipping machine with electrical energy from the further energy reservoir of the further automated machine if necessary, if the electrical energy of the energy reservoir of the coverslipping machine happens to be insufficient for carrying out the safety routine of the coverslipping machine.

With regard to the further automated machine provision can advantageously be made in particular, very generally, that the further automated machine removes samples from a magazine and respectively carries out a processing process in which at least one processing step is carried out, and then deposits the processed sample in the magazine or in a further magazine. It is especially advantageous, in particular, if the automated machine comprises a further electrical energy reservoir as well as a further electronic control apparatus which detects disruptions in the supply of electrical energy from the power grid and, in the event of a disruption, switches over to a withdrawal of electrical energy from the further electrical energy reservoir, and which carries out a further safety routine that includes at least the safety steps of completing the processing of samples that are already in the processing process, and then conveying them into a secure position.

As has already been mentioned with reference to a coverslipping machine, provision can advantageously also be made analogously, with reference to a further automated machine, that processing parameters that are important for processing the sample, and/or data for identifying the individual samples, are stored in an, in particular nonvolatile, data memory so that said data can be accessed upon a restart. The data for identifying the samples can relate in particular to the samples that have already been processed, so that after a restart in the normal operating mode, only the unprocessed samples can reliably be processed.

Alternatively, with regard to the further automated machine provision can also advantageously be made, very generally, that the further automated machine receives samples that are arranged in magazines and carries out, on the samples respectively arranged in a magazine, a processing process in which at least one processing step is carried out, and then outputs the magazine having the collectively processed samples. It is preferable in this context if all the samples that are arranged in a magazine are processed identically and simultaneously in the processing process. In this embodiment as well, the further automated machine preferably comprises a further electrical energy reservoir and a further electronic control apparatus which detects disruptions in the supply of electrical energy from the power grid and, in the event of a disruption, switches over to a withdrawal of electrical energy from the further electrical energy reservoir, and which carries out a further safety routine that includes at least the safety steps of completing the processing of magazines that have samples and are already in the processing process, and then conveying them into a safe position.

With reference to a further automated machine of this kind as well, provision can advantageously be made in particular that processing parameters that are important for the processing magazines and/or of the samples present therein, and/or data for identification of the individual magazines and/or samples, are stored in an, in particular nonvolatile, data memory so that said data can be accessed upon a restart. The data for identification can relate in particular to the magazines that have already been processed, so that after a restart in normal operation, only the unprocessed magazines can reliably be processed.

A further automated machine of this kind can be, for example, a stainer in which magazines, together with the samples present therein, are immersed successively into various baths, in particular baths having staining chemicals. Provision can be made here that all the magazines pass through the same sequence of baths. It is nevertheless also advantageously possible for different magazines to pass through different combinations of baths in order to subject the samples that are arranged in one magazine to a different staining process from the samples that are arranged in another magazine. It is especially important in this context that processing parameters that are important for the processing magazines and/or the samples present therein, and/or data for identification of the individual magazines and/or samples, be stored in an, in particular nonvolatile, data memory in the event of a disruption in the supply of grid power, in particular in order to avoid problems upon restarting.

A possible embodiment of a system according to the present invention which comprises a coverslipping machine and a further automated machine embodied as a stainer is particularly advantageous. Provision can advantageously be made in this context, in particular, that the coverslipping machine and the stainer are coupled in such a way that the coverslipping machine can automatically transfer specimen slide magazines, having samples that have already been coverslipped, to the stainer, which then performs a staining process on the samples arranged in the specimen slide magazine.

Provision can advantageously be made in this context, in particular, that the control apparatus of the coverslipping machine or a further control apparatus of the further automated machine establishes the electrical connection, in particular automatically, when it detects a disruption in the supply of electrical energy from the power grid.

An embodiment in which the control apparatus establishes the electrical connection, in particular automatically, when it detects a disruption in the supply of electrical energy from the power grid and ascertains that the current charge state of the energy reservoir is predicted to be insufficient for carrying out the safety routine, is very particularly advantageous. Alternatively or additionally, provision can also be made that the further control apparatus of the further automated machine establishes the electrical connection, in particular automatically, when it detects a disruption in the supply of electrical energy from the power grid and ascertains that the current charge state of the further energy reservoir is predicted to be insufficient for carrying out the further safety routine.

In an advantageous embodiment, the control apparatus controls the transfer of electrical energy from the coverslipping machine to the further automated machine and/or the transfer of electrical energy from the further automated machine to the coverslipping machine, in particular in accordance with demand. Alternatively, it is also possible for the further control apparatus of the further automated machine to control the transfer of electrical energy from the coverslipping machine to the further automated machine and/or the transfer of electrical energy from the further automated machine to the coverslipping machine, in particular in accordance with demand.

In a very particularly advantageous embodiment of the system, the control apparatus and a further control apparatus of the further automated machine together control the transfer of electrical energy from the coverslipping machine to the further automated machine and/or the transfer of electrical energy from the further automated machine to the coverslipping machine, in particular in accordance with demand. Provision can advantageously be made in this context, in particular, for the control apparatus to transfer data regarding the charge state and/or the predicted remaining operating time of the energy reservoir to the further control apparatus, and/or for the further control apparatus to transfer data regarding the charge state of the further energy reservoir, and/or the predicted remaining operating time of the further energy reservoir, to the control apparatus.

The further automated machine can be, for example, an automatic scanner or an automated machine for embedding samples into a paraffin block or a stainer or an automatic processor or a further coverslipping machine.

BRIEF DESCRIPTION OF THE DRAWING VIEWS

The subject matter of the invention is depicted schematically and by way of example in the drawings, and will be described below with reference to the Figures, identical or identically functioning elements usually being labeled with the same reference characters even in different exemplifying embodiments. In the Figures.

DETAILED DESCRIPTION

Figure 1:
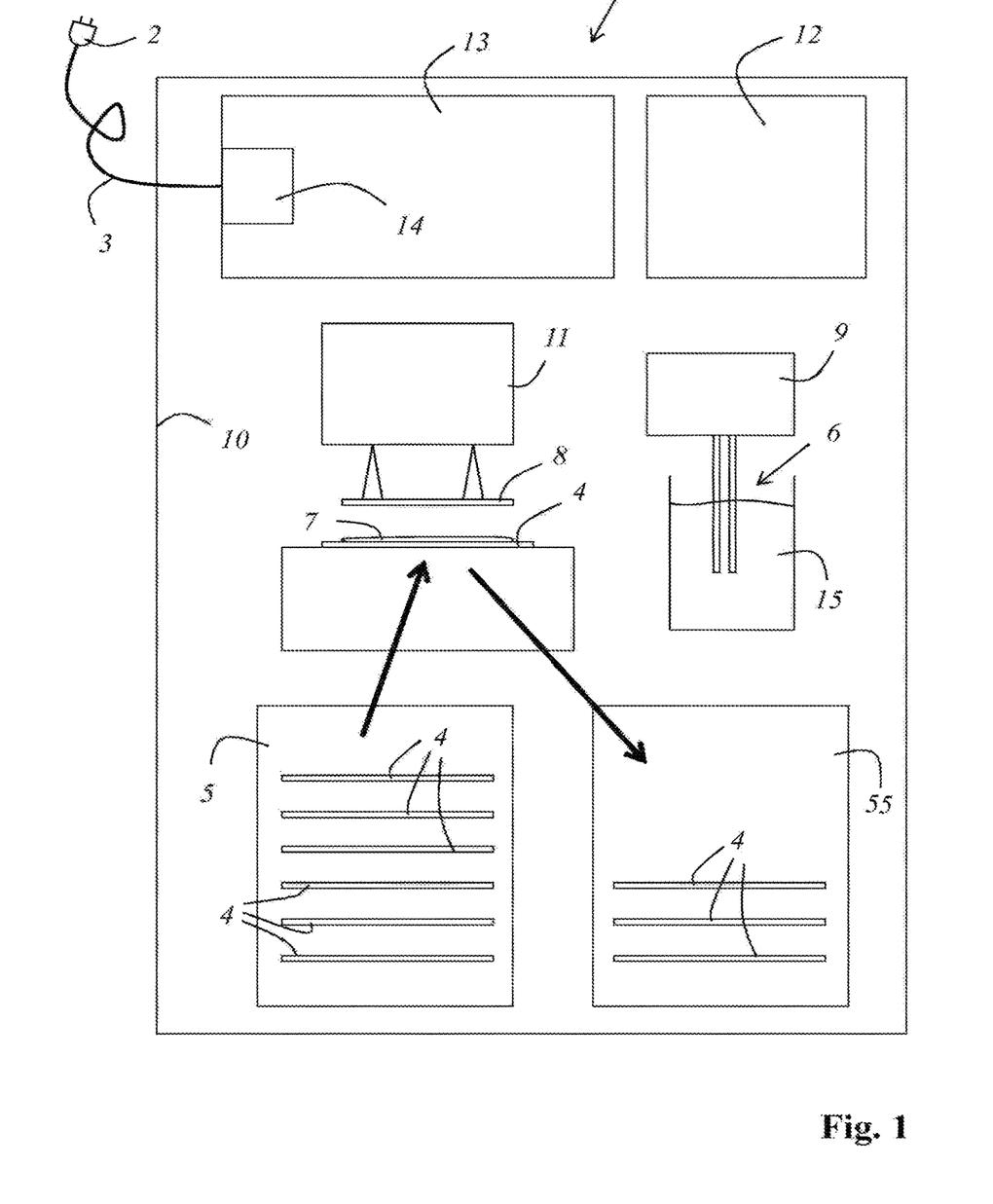
FIG. 1 schematically shows an exemplifying embodiment of a coverslipping machine according to the present invention.

FIG. 1 shows, very schematically, an exemplifying embodiment of a coverslipping machine 1 according to the present invention. Coverslipping machine 1 comprises a power plug 2 and a connector cable 3 with which it can be connected to an electrical power grid (not depicted). Coverslipping machine 1 is embodied to remove specimen slides 4, having samples present thereon, from a specimen slide magazine 5 and deliver them to a coverslipping process in which a mounting medium 7 is applied by means of a hollow needle 6, and then a coverslip 8 is applied, onto each specimen slide 4.

Hollow needle 6 can be moved in motorizedly controlled fashion, by means of a manipulator 9, within housing 10 of coverslipping machine 1. Provision is made in particular that upon the application of mounting medium 7, hollow needle 6 is moved relative to the respective specimen slide 4 that is currently to be coverslipped, in order to distribute mounting medium 7 on specimen slide 4.

Coverslips 8 that are to be applied are individually removed, by means of a further manipulator 11, from a reservoir container (not depicted) and transported to specimen slide 4 that is currently being processed. Once the coverslip has been applied, the respective specimen slide 4 that has just been coverslipped is deposited in a further specimen slide magazine 55.

In the normal operating mode, the energy necessary for carrying out the steps required for coverslipping is withdrawn from the electrical power grid to which coverslipping machine 1 is connected via power plug 2 and connector cable 3.

Coverslipping machine 1 comprises an electrical energy reservoir 12 and an electronic control apparatus 13. Electronic control apparatus 13 is embodied to detect, by means of a sensor 14, disruptions in the supply of electrical energy from the power grid to which coverslipping machine 1 is connected. In the event of a disruption, control apparatus 13 switches to a withdrawal of electrical energy from electrical energy reservoir 12, and carries out a safety routine that includes at least the safety steps of completing the coverslipping of specimen slides 4 already equipped with mounting medium 7, i.e. providing them with a coverslip 7, and then depositing them correctly in further specimen slide magazine 55.

The safety routine furthermore comprises, as a further safety step, dipping hollow needle 6 into a solvent bath 15 that contains a solvent, in order to prevent mounting medium 7 from drying out in hollow needle 6.

Figure 2:
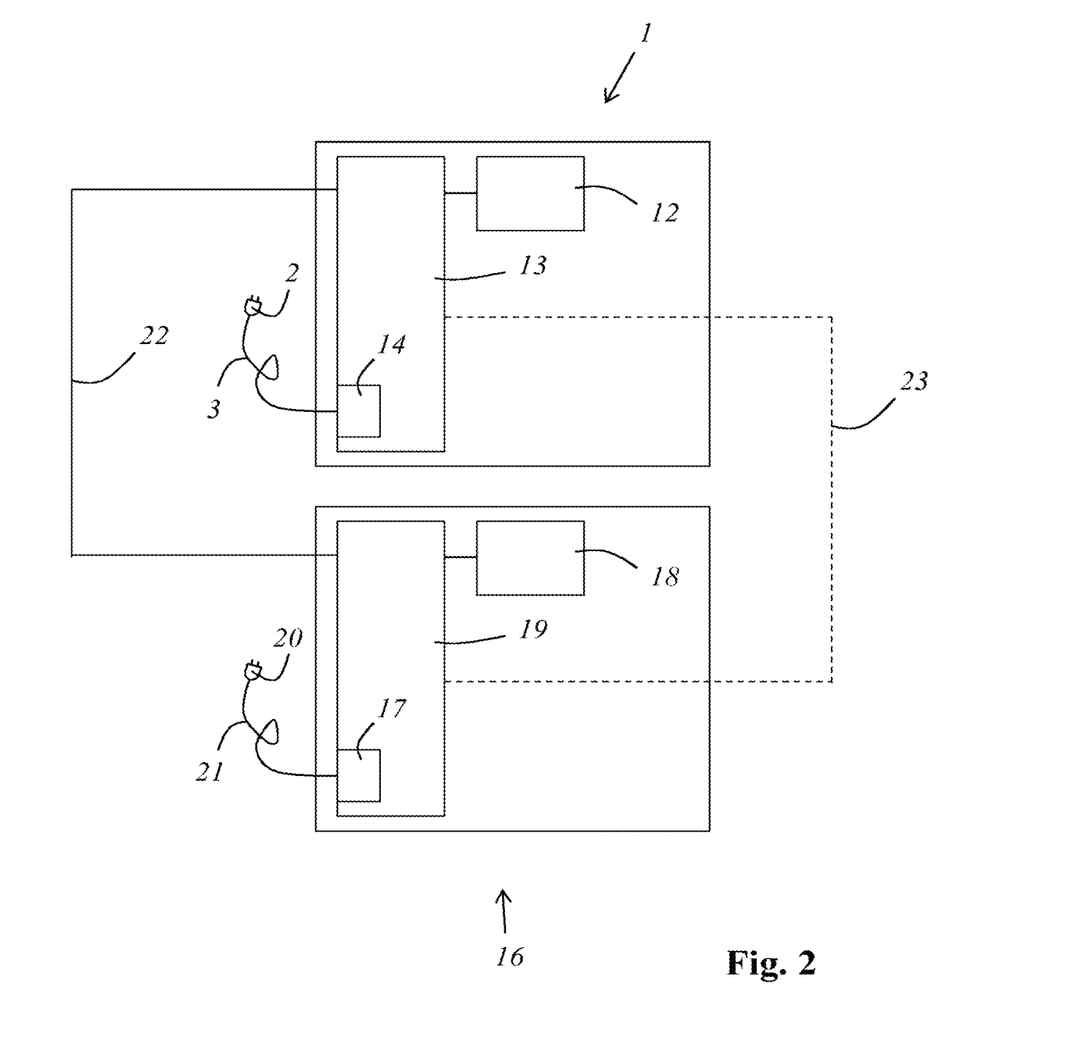
FIG. 2 schematically shows an exemplifying embodiment of a system that includes a coverslipping machine and a further automated machine.

FIG. 2 shows a system that includes an exemplifying embodiment of a coverslipping machine 1 according to the present invention. Coverslipping machine 1 is depicted merely schematically and incompletely; for better clarity, only power plug 2, connector cable 3, energy reservoir 12, and control apparatus 13 along with sensor 14 are shown, while the remaining components of coverslipping machine 1 are not depicted.

The system furthermore includes a further automated machine 16 that can be embodied, for example, as a processor 24, an automatic embedding machine 25, an automatic microtome 26, a stainer 27, or an automatic scanner 28. The further automated machine 16 includes a further energy reservoir 18 as well as a further control apparatus 19 having a further sensor 17. Further automated machine 16 is embodied, just like coverslipping machine 1, to be connected to an electrical power grid in order to be supplied with electrical energy as a load, and comprises for that purpose a further power plug 20 and a further connector cable 21.

Further automated machine 16 can be embodied in particular to remove samples (not depicted) from a magazine (not depicted) and to carry out a respective processing process in which at least one processing step is carried out, and then to deposit the processed sample in the magazine or in a further magazine (not depicted). Further automated machine 16 as well is embodied to detect disruptions in the supply of electrical energy from the power grid and, in the event of a disruption, to switch to a withdrawal of electrical energy from the further electrical energy reservoir 18 and to carry out a safety routine. The safety routine can advantageously comprise, in particular, completing the processing of samples that are already in the processing process, and then conveying them into a safe position.

Coverslipping machine 1 and further automated machine 16 are electrically connected via a supply lead 22 in such a way that electrical energy is transferrable from energy reservoir 12 of coverslipping machine 1 to further automated machine 16, and/or so that electrical energy is transferrable from further automated machine 16, namely from its energy reservoir 18, to energy reservoir 12 of coverslipping machine 1.

Also present is a data connection 23 by way of which control apparatus 13 and further control apparatus 19 exchange data regarding the current charge state and/or regarding a precalculated remaining operating time. The data are used in order to distribute the available energy of energy reservoir 12 and of further energy reservoir 18 in accordance with demand, so that in the event of a disruption in the grid power supply, coverslipping machine 1 and further automated machine 16 can each carry out their safety routine in order to prevent damage to the samples or to the equipment.

Figure 3:
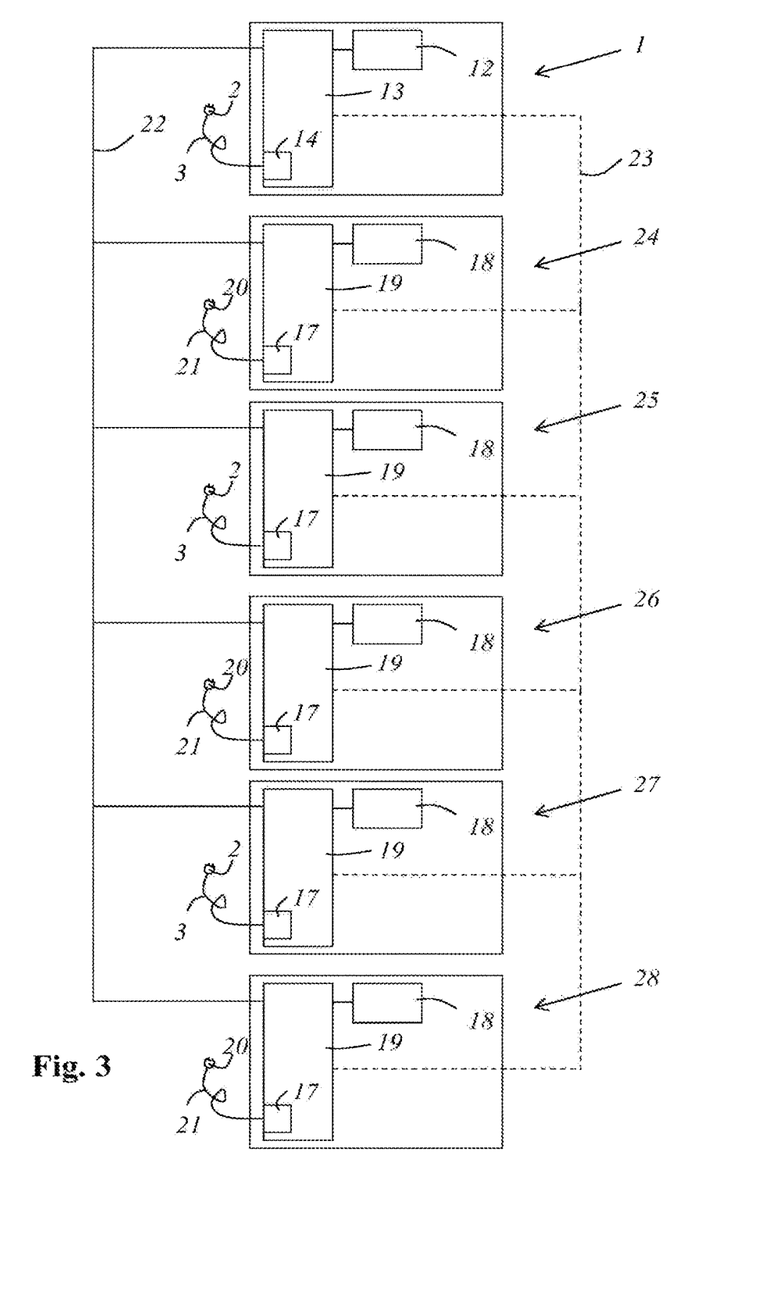
FIG. 3 schematically shows another exemplifying embodiment of a system that includes a coverslipping machine and several further automated machines.

FIG. 3 shows another exemplifying embodiment of a system that includes a coverslipping machine 1 and further automated machines. The further automated machines are embodied as a processor 24, an automatic embedding machine 25, an automatic microtome 26, a stainer 27, and an automatic scanner 28. Each of these automated machines comprises a further energy reservoir 18 and a further control apparatus 19, energy reservoir 12 and further energy reservoirs 18 being connected to one another, respectively via control apparatus 13 and via further control apparatuses 19 and a supply lead 22, in order to be able to provide a distribution of the available electrical energy, in the event of a failure of grid power, between automated machines 1, 24, 25, 26, 27, 28 in accordance with demand. Provision is advantageously made for that purpose that data regarding the charge states and predicted energy demand for carrying out the respective safety routines is exchanged among automated machines 1, 24, 25, 26, 27, 28 in order to distribute the available electrical energy of energy reservoir 12 and of further energy reservoirs 18 in accordance with demand, in such a way that each automated machine 1, 24, 25, 26, 27, 28 can perform its entire safety routine.

PARTS LIST

1 Coverslipping machine
2 Power plug
3 Connector cable
4 Specimen slide
5 Specimen slide magazine
6 Hollow needle
7 Mounting medium
8 Coverslip
9 Manipulator
10 Housing
11 Further manipulator
12 Energy reservoir
13 Control apparatus
14 Sensor
15 Solvent bath
16 Further automated machine
17 Further sensor
18 Further energy reservoir
19 Further control device
20 Further power plug
21 Further connector cable
22 Supply lead
23 Data connection
24 Processor
25 Automatic embedding machine
26 Automatic microtome
27 Stainer
28 Automatic scanner
55 Further specimen slide magazine

What is claimed is:

1. A system comprising:
    a first automatic machine (1) for processing or investigating biological samples, the first automatic machine (1) comprising a first electrical energy reservoir (12); and
    a second automatic machine (16) for processing or investigating biological samples;
    wherein the first automatic machine (1) is configured to be connected to an electrical power grid in order to be supplied with electrical energy as an electrical load, and
    wherein the first automatic machine (1) and the second automatic machine (16) are electrically connected such that electrical energy is transferrable from the first electrical energy reservoir (12) of the first automatic machine (1) to the second automatic machine (16).

2. The system according to claim 1, wherein the first automatic machine (1) further comprises:
    a first electronic control apparatus (13) configured to detect disruptions in the supply of electrical energy from the power grid and, in the event of a disruption, switch over to a withdrawal of electrical energy from the first electrical energy reservoir (12).

3. The system according to claim 2, wherein the first electronic control apparatus (13) is configured to automatically establish the electrical connection with the second automatic machine (16) when the first electronic control apparatus (13) detects a disruption in the supply of electrical energy from the power grid and ascertains that a current charge state of the first electrical energy reservoir (12) is not in a predetermined minimum charge state.

4. The system according to claim 3, wherein the first electronic control apparatus (13) is further configured to switch the first automatic machine (1) back into a normal operating mode when the disruption in the supply of electrical energy from the power grid no longer exists and/or the first electrical energy reservoir (12) is in the predetermined minimum charge state.

5. The system according to claim 3, wherein the first electronic control apparatus (13) is further configured to transfer data regarding the charge state of the electrical energy reservoir (12) to a second electronic control apparatus (19) of the second automatic machine (16).

6. The system according to claim 2, wherein the first electronic control apparatus (13) is further configured to execute a first safety routine when the first electronic control apparatus (13) detects a disruption in the supply of electrical energy from the power grid.

7. The system according to claim 1, wherein the second automatic machine (16) is configured to be connected to an electrical power grid in order to be supplied with electrical energy as a load, the second automatic machine (16) comprising:
    a second electrical energy reservoir (18);
    wherein the electrical energy is transferrable from the second electrical energy reservoir (18) of the second automatic machine (16) to the first automatic machine (1).

8. The system according to claim 7, wherein the second automatic machine (16) further comprises:
    a second electronic control apparatus (19) configured to detect disruptions in the supply of electrical energy from the power grid and, in the event of a disruption, switch over to a withdrawal of electrical energy from the second electrical energy reservoir (18).

9. The system according to claim 8, wherein the second electronic control apparatus (19) of is further configured to automatically establish the electrical connection with the first automatic machine (1) when the second electronic control apparatus (19) detects a disruption in the supply of electrical energy from the power grid and ascertains that a current charge state of the second electrical energy reservoir (18) is not in a predetermined minimum charge state.

10. The system according to claim 9, wherein the second electronic control apparatus (19) is further configured to switch the second automatic machine (16) back into a normal operating mode when the disruption in the supply of electrical energy from the power grid no longer exists and/or the second electrical energy reservoir (18) is in the predetermined minimum charge state.

11. The system according to claim 9, wherein the second electronic control apparatus (19) is further configured to transfer data regarding the charge state of the second electrical energy reservoir (18) to a first electronic control apparatus (13) of the first automatic machine (1).

12. The system according to claim 8, wherein the second electronic control apparatus (19) is further configured to execute a second safety routine when the second electronic control apparatus (19) detects a disruption in the supply of electrical energy from the power grid.

13. The system according to claim 1, wherein the first automatic machine (1) comprises a first electronic control apparatus (13) and the second automatic machine (16) comprises a second electronic control apparatus (19), the first electronic control apparatus (13) and the second electronic control apparatus (19) being connected by a data connection (23).

14. The system according to claim 13, wherein the first electronic control apparatus (13) and the second electronic control apparatus (19) together control the transfer of electrical energy from the first automatic machine (1) to the second automatic machine (16) and/or the transfer of electrical energy from the second automatic machine (16) to the first automatic machine (1).

15. The system according to claim 13, wherein the first electronic control apparatus (13) controls the transfer of electrical energy from the first automatic machine (1) to the second automatic machine (16) and/or the transfer of electrical energy from the second automatic machine (16) to the first automatic machine (1).

16. The system according to claim 13, wherein the second electronic control apparatus (19) controls the transfer of electrical energy from the first automatic machine (1) to the second automatic machine (16) and/or the transfer of electrical energy from the second automatic machine (16) to the first automatic machine (1).

17. The system according to claim 1, wherein the first automatic machine (1) is a coverslipping machine (1) which removes specimen slides (4), having samples present thereon, from a specimen slide magazine (5) and respectively carries out a coverslipping process in which a mounting medium (7) and then a coverslip (8) are applied onto each specimen slide (4); and which deposits the coverslipped specimen slides (4) in the specimen slide magazine (5) or in a further specimen slide magazine (55).

18. The system according to claim 1, wherein the first automatic machine (1) is an automatic scanner (28) or an embedding machine (25) or an automatic microtome (26) or a stainer or an automatic processor (24) or a coverslipping machine.

19. The system according to claim 1, wherein the second automatic machine (16) is an automatic scanner (28) or an embedding machine (25) or an automatic microtome (26) or a stainer or an automatic processor (24) or a coverslipping machine.

20. The system according to claim 19, wherein the second automatic machine (16) is configured to receive samples from the first automatic machine (1) that are arranged in magazines and execute, on the samples respectively arranged in a magazine, a processing process in which at least one processing step is executed, and then output the magazine having the collectively processed samples.

21. The system according to claim 1, wherein the first automatic machine (1) is configured to remove samples from a magazine and to carry out a processing process in which at least one processing step is carried out, and to deposit the processed sample in the magazine or in a further magazine.

22. The system according to claim 1, wherein the second automatic machine (16) is configured to remove samples from a magazine and to carry out a processing process in which at least one processing step is carried out, and to deposit the processed sample in the magazine or in a further magazine.

* * * * *